United States Patent
Noh

(10) Patent No.: US 6,749,962 B2
(45) Date of Patent: Jun. 15, 2004

(54) LITHIUM BATTERY HAVING AN ELECTROLYTE GEL USING A CROSSLINKED PREPOLYMER TO FORM AN EPOXY RESIN

(75) Inventor: Hyung-gon Noh, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 278 days.

(21) Appl. No.: 09/854,918

(22) Filed: May 15, 2001

(65) Prior Publication Data

US 2002/0015893 A1 Feb. 7, 2002

(30) Foreign Application Priority Data

May 15, 2000 (KR) ........................................ 2000-25767

(51) Int. Cl.[7] ............................................... H01M 6/16
(52) U.S. Cl. ..................... 429/189; 429/300; 429/303; 252/62.2; 29/623.1
(58) Field of Search ......................... 252/62.2; 429/188, 429/189, 300, 303–306, 317, 322; 205/674, 414; 204/414; 29/623.1

(56) References Cited

U.S. PATENT DOCUMENTS

| | | | |
|---|---|---|---|
| 5,096,561 A | * | 3/1992 | Akhtar ........................ 204/296 |
| 5,279,910 A | | 1/1994 | Sasaki et al. |
| 5,290,644 A | * | 3/1994 | Andrieu ....................... 429/129 |
| 5,340,368 A | | 8/1994 | Koksbang et al. |
| 5,437,942 A | | 8/1995 | Murata et al. |
| 5,972,539 A | | 10/1999 | Hasegawa et al. |
| 2002/0136958 A1 | * | 9/2002 | Park et al. .................... 429/303 |

OTHER PUBLICATIONS

Peng et al., "Ionic conductivity of epoxy network/polyethylene–glycol–lithium perchlorate complex IPN system", Chinese Journal of Polymer Science (1990), 8(4), pp. 342–346. (no month).*

Definition for prepolymer. copyright 1989 CRC Press LLC. [online]. About,Inc., 2003 [retrieved on Mar. 28, 2003]. Retrieved fro the Internet: <URL: http://plastic.about.com/library/glossary/p/bldef–p4237.htm>.*

CAPLUS abstract for Peng et al. "Ionic Conductivity of epoxy network/polyethylene glycol–lithium perchlorate complex IPN system" in Chinese Journal of Polymer Science (1990), 8(4), 342–6 (no month).*

* cited by examiner

Primary Examiner—Susy Sang-Foster
(74) Attorney, Agent, or Firm—Staas & Halsey LLP

(57) ABSTRACT

A lithium battery including an electrode assembly having a cathode, an anode and a separator interposed between the cathode and the anode, a gel-state electrolyte solution having a crosslinking product of prepolymer for forming epoxy resin and amine, a lithium salt and an organic solvent, and a case accommodating the electrode assembly and the electrolyte solution.

16 Claims, 3 Drawing Sheets

LITHIUM BATTERY HAVING AN ELECTROLYTE GEL USING A CROSSLINKED PREPOLYMER TO FORM AN EPOXY RESIN

CROSS REFERENCE TO RELATED APPLICATIONS

This application claims the benefit of Korean Patent Application No. 00-25767, filed May 15, 2000, in the Korean Industrial Property Office, the disclosure of which is incorporated herein by reference.

BACKGROUND OF THE INVENTION

1. Field of the Invention

The present invention relates to a lithium battery, and more particularly, to a lithium battery having improved safety and reliability by using a gel-state electrolyte solution.

2. Description of the Related Art

A lithium secondary battery generates electricity by lithium ions reciprocating between a cathode and an anode. The lithium secondary battery has a high energy density relative to the unit volume and voltage thereof compared to a Ni-Cd battery or a Ni-H battery, and the weight thereof is approximately half that of the Ni-Cd battery or the Ni-H battery. Thus, the lithium secondary battery is suitably used for small size, lightweight, longlasting electronic devices. As described above, lithium secondary batteries have attracted particular attention because of their excellent characteristics, such as high operating voltage, much better charging/discharging cycle and environmentally benign characteristics and so on, compared to conventional Ni-Cd batteries or Ni-H batteries.

However, since they are highly explosive, safety is a critical issue for practical use of lithium secondary batteries.

Lithium secondary batteries are classified according to the kind of electrolyte used, including lithium ion batteries using liquid electrolyte and lithium ion polymer batteries using polymer solid electrolyte.

The lithium ion battery generally utilizes a cylindrical case or a rectangular case as a case for hermetically sealing the electrode assembly. However, recently, a greater attention has been paid to a method in which a pouch is used instead of the case because use of the pouch increases energy density per unit weight or volume and allows attainment of small, lightweight batteries at low cost.

FIG. 1 is an exploded perspective view of an exemplary lithium ion battery using a pouch as a case.

Referring to FIG. 1, a lithium ion battery includes an electrode assembly 10 consisting of a cathode 11, an anode 12, a separator 13, and a case 20 for hermetically sealing the electrode assembly 10. Here, the electrode assembly 10 is formed by interposing the separator 13 between the cathode 11 and the anode 12 and winding the structure. A cathode tap 11' and an anode tap 12' serving as electrical paths between the electrode assembly 10 and the exterior, are drawn from the cathode 11 and the anode 12 to form electrode terminals 14 and 14'.

FIG. 2 is an exploded perspective view illustrating an exemplary conventional lithium ion polymer battery.

Referring to FIG. 2, a lithium ion polymer battery includes an electrode assembly 21 having a cathode, an anode and a separator, and a case 22 for hermetically sealing the electrode assembly 21. Electrode terminals (or lead wires) 24 and 24' serving as electrical paths for inducing the current formed at the electrode assembly 21 to the exterior are installed to be connected to a cathode tap 23 and an anode tap 23' to then be exposed by a predetermined length outside the case 22.

As described above, in the lithium ion battery shown in FIG. 1 and the lithium ion polymer battery shown in FIG. 2, the electrode assemblies 10 and 21 are put into the cases 20 and 22, respectively, and an electrolyte solution is inserted thereinto, with only parts of the electrode terminals 14 and 14' and 24 and 24', respectively, being exposed to the exterior. Then, heat and pressure are applied to each resultant structure so that thermally adhesive materials at the edges of the upper and lower case parts cause the upper and lower case parts to adhere together to then be hermetically sealed, thereby completing the batteries.

As described above, the electrolyte solution is injected in the latter part of the processing steps. Thus, in the case of using an organic solvent having a low boiling point, the electrode assemblies or pouches may be swollen, which deteriorates the battery reliability and safety.

To solve the problem, there have been proposed several methods, in which an electrode and an electrolyte are formed by hardening using ultraviolet rays or electron beams, or a gel-state electrolyte solution is coated on electrode plates without separate injection of an electrolyte solution, as disclosed in U.S. Pat. Nos. 5,972,539, 5,279,910, 5,437,942 and 5,340,368. In practical application of the proposed methods, swelling of an electrode assembly or a pouch for example, due to evaporation of the organic solvent, is somewhat mitigated, but is still not satisfactory.

SUMMARY OF THE INVENTION

Accordingly, it is an object of the present invention to provide a gel-state electrolyte solution which can effectively suppress swelling due to an electrolyte solution, and a lithium battery which can prevent the reliability and safety of the battery from lowering due to swelling of the electrolyte solution.

Additional objects and advantages of the invention will be set forth in part in the description which follows and, in part, will be obvious from the description, or may be learned by practice of the invention.

The foregoing objects of the present invention are achieved by providing a gel-state electrolyte solution consisting of a crosslinking product of prepolymer for forming epoxy resin and amine, a lithium salt and an organic solvent.

The foregoing objects of the present invention may also be achieved by providing a lithium battery including an electrode assembly consisting of a cathode, an anode and a separator interposed between the cathode and the anode, a gel-state electrolyte solution consisting of a crosslinking product of prepolymer for forming epoxy resin and amine, a lithium salt and an organic solvent, and a case for accommodating the electrode assembly and the electrolyte solution.

The electrolyte solution may be obtained by mixing a mixture of prepolymer for forming epoxy resin and amine with a mixture of the lithium salt and the organic solvent, injecting the resultant mixture into the case having the electrode assembly, and thermally polymerizing the same.

In particular, the electrode assembly may be a winding type electrode assembly, and the case is preferably in the form of a pouch. Thus, the energy density of the battery per unit weight and volume is increased. Also, attainment of a small size and light weight battery is allowed. Further, the cost of a raw material for a case can be reduced.

BRIEF DESCRIPTION OF THE DRAWINGS

These and other objects and advantages of the present invention will become apparent and more readily appreciated from the following description of the preferred embodiments, taken in conjunction with the accompanying drawings of which.

DESCRIPTION OF THE PREFERRED EMBODIMENT

Figure 1:
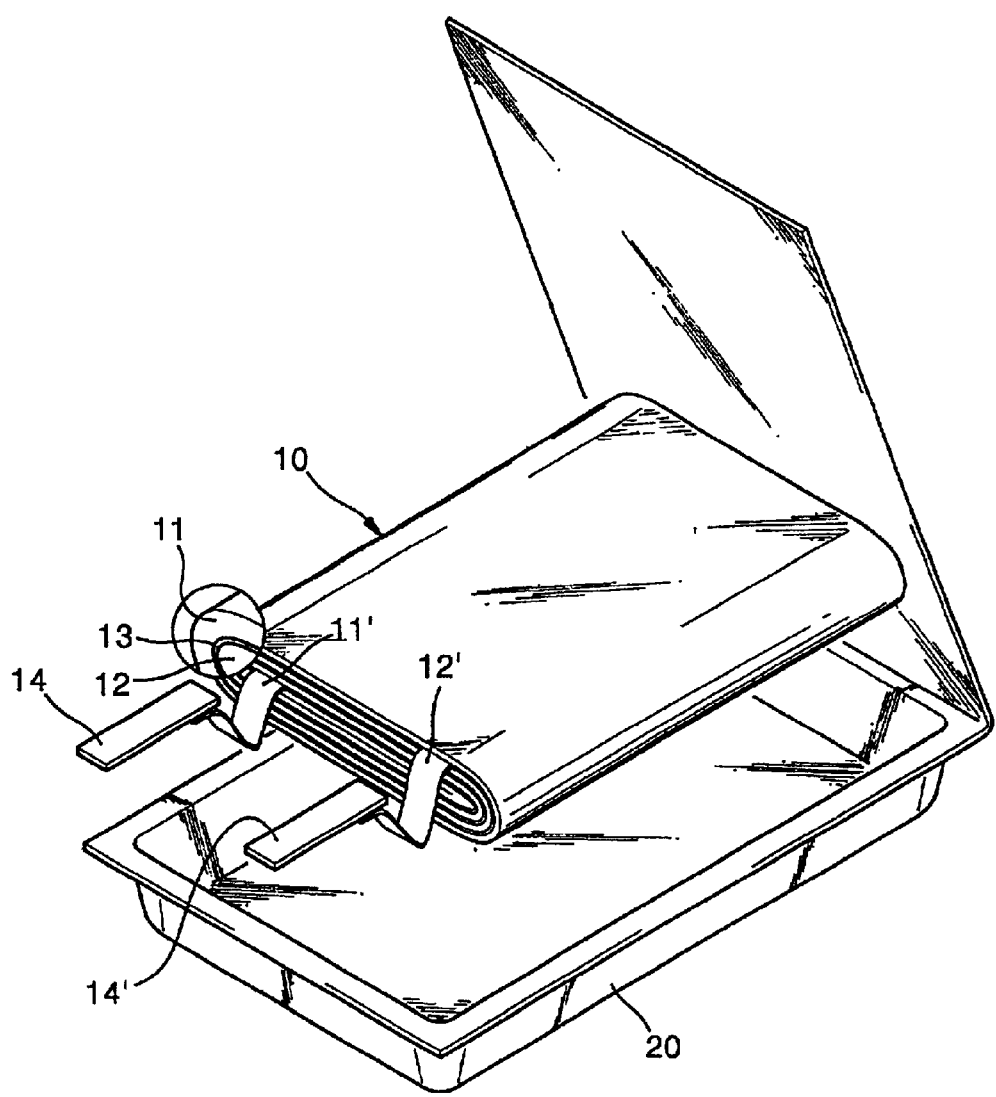
FIG. 1 is an exploded perspective view illustrating an exemplary general lithium ion battery.

Reference will now be made in detail to the embodiments of the present invention, examples of which are illustrated in the accompanying drawings, wherein like reference numerals refer to the like elements throughout. The embodiments are described below in order to explain the present invention by referring to the figures.

A feature of the present invention lies in that, instead of a conventional liquid-phase electrolyte solution, an electrolyte solution having a crosslinking product of a prepolymer for forming an epoxy resin, amine, a lithium salt and an organic solvent and being in a gel-state.

The prepolymer for forming epoxy resin is a compound containing two or more epoxide rings, represented by formula 1:

[Formula 1]

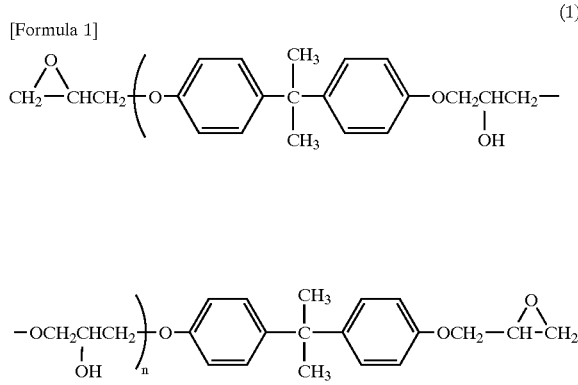

(1)

wherein n is an integer from 2 to 100.

The weight-average molecular weight of the compound represented by formula 1 is preferably 1000 to 3000. If the weight-average molecular weight of the compound represented by formula 1 is outside the above-noted range, the compound is undesirably difficult to dissolve.

The amine is not specifically restricted, but a compound having two or more tertiary amine groups represented by formula 2 is preferably used. Here, use of the tertiary amine groups represented by formula 2 facilitates suppression of a side reaction of the crosslinking reaction between prepolymer for forming epoxy resin and amine.

[Formula 2]

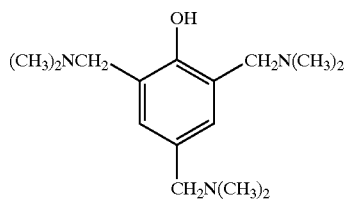

(2)

A process for preparing a gel-state electrolyte solution using prepolymer for forming epoxy resin and amine will now be described.

First, the prepolymer for forming the epoxy resin and the amine are mixed in an appropriate molar ratio and then added to a lithium salt and an inorganic solvent to then be mixed. Here, the molar ratio of the prepolymer for forming the epoxy resin to the amine may be in the range of 1:1 to 5:1. If the molar ratio of prepolymer for forming epoxy resin to amine is outside the above-stated range, gelation may not be easily achieved. During the mixing step, the ratio of the total weight of prepolymer for forming epoxy resin and amine to the total weight of the lithium salt and the inorganic solvent in the range of 1:1 to 1:20. Other ranges are possible. However, if the ratio of the total weight of prepolymer for forming epoxy resin and amine to the total weight of the lithium salt and the inorganic solvent is greater than the above range, gelation might not be as easily achieved. If the ratio of the total weight of prepolymer for forming epoxy resin and amine to the total weight of the lithium salt and the inorganic solvent is less than the above range, the performance of the resulting battery may be less than desired.

Next, the mixture is thermally polymerized at a temperature in the range of 70 to 200° C. Then, the crosslinking reaction between the prepolymer for forming the epoxy resin and the amine occurs to thereby form the crosslinked product. Thus, gelation of the electrolyte solution is achieved.

In the present invention, usable organic solvents for forming the electrolyte solution include at least one carbonate based solvent selected from the group consisting of propylene carbonate (PC), ethylene carbonate (EC), dimethylcarbonate (DMC), methylethyl carbonate (MEC), diethylcarbonate (DEC) and vinylene carbonate (VC). In particular, in the case of using vinylene carbonate (VC) as the organic solvent of the electrolyte solution, the performance of a battery, specifically, a lifetime characteristic, is improved. Usable lithium salts include at least one ionic lithium salt selected from the group consisting of lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$) and lithium bistrifluoromethanesulfonyl amide ($LiN(CF_3SO_2)_2$).

A method for preparing a lithium battery according to the present invention containing the above-described electrolyte solution will now be described.

First, an electrode active material layer is formed on a current collector using an electrode active material composition containing an electrode active material, a binder, a conductive agent and a solvent. Here, the method for forming the electrode active material layer includes a method in which the electrode active material composition is directly coated on the current collector. Alternatively, the electrode active material coated on a separate support body and dried, and then a film obtained by being peeled off from the support body is laminated on the current collector. Here, any material that is capable of supporting an electrode active material layer can be used as the support body, and detailed examples thereof include a mylar film, a polyethyleneterephthalate (PET) film and the like.

In the present invention, lithium composite oxide such as $LiCoO_2$, or a sulfur compound such as active sulfur or organic sulfur may be used as the cathode active material. Also, metallic lithium, carbon, graphite or the like may be used as the anode active material. Carbon black may be used as the conductive agent. Here, the content of the conductive agent is preferably 1 to 20 parts by weight based on 100 parts by weight of the electrode active material, e.g., $LiCoO_2$. Although other amounts of the conductive agent are possible, the content of the conductive agent is less than 1 part by weight, the conductivity of the electrode may be decreased. If the content of the conductive agent is greater than 20 parts by weight, the content of electrode active material may be relatively reduced, which is undesirable in view of capacity. In particular, in the case of using metallic lithium as the anode active material, the safety of the resulting battery can be greatly improved by using the electrolyte solution according to the present invention.

As the binder, polyvinylidenefluoride-hexafluoropropylene copolymer (VdF-HFP copolymer), polyvinylidenefluoride, polyacrylonitrile, polymethylmethacrylate and mixtures thereof may be used. The content of the binder is preferably 5 to 30 parts by weight based on 100 parts by weight of the electrode active material. While other amounts are possible, the content of the binder is less than 5 parts by weight, the adhesion of the active material layer to the current collector may be undesirably lowered. If the content of the binder is greater than 30 parts by weight, the content of the electrode active material is relatively reduced, which may be undesirable in view of charging capacity.

Any solvent that is generally used for lithium batteries can be used as the solvent, and examples thereof include acetone, N-methylpyrrolidone, and the like.

Occasionally, $Li_2CO_3$ may be further added to the electrode active material composition. Adding $Li_2CO_3$ enhances the battery performance, specifically, high-rate performance.

Figure 2:
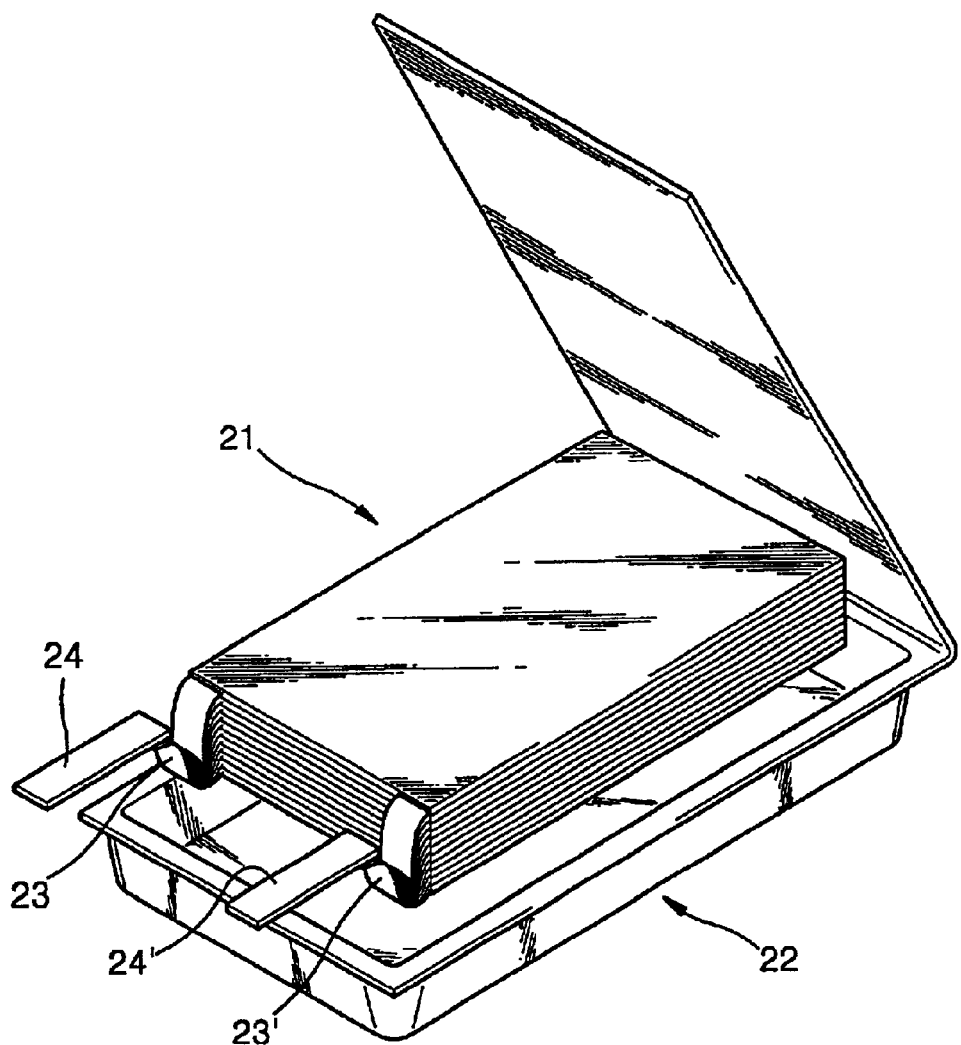
FIG. 2 is an exploded perspective view illustrating an exemplary general lithium ion polymer battery.

The separator used in the present invention is not specifically limited, and a polyethylene separator or a polypropylene separator that is easily wound is preferably used. The separator is interposed between the cathode plate and the anode plate and then wound in a jelly-roll type configuration to fabricate an electrode assembly (see FIG. 1) or a bi-cell electrode assembly (see FIG. 2). Subsequently, the electrode assembly is put into a case. Then, the prepolymer for forming an epoxy resin and the amine are mixed in an appropriate molar ratio. Then, the mixture is combined and mixed with a lithium salt and an inorganic solvent. This mixture is injected into the case.

Thereafter, the case is hermetically sealed and then the resultant structure is placed in an oven maintained at a predetermined temperature for a predetermined time. The temperature of the oven is preferably adjusted to be in the range of about 70 to 200° C. Although other temperatures are possible, if the temperature of the oven is lower than 70° C., polymerization may not occur. If the temperature of the oven is higher than 200° C., the binder may be undesirably dissolved.

As the result of the reaction, thermal polymerization between the prepolymer for forming the epoxy resin and the amine occur to produce a crosslinking product, so that the electrolyte solution is turned into a gel phase. As described above, if the electrolyte solution exists in the gel-state, it is not likely to be leaked outside. Also, swelling of an electrode assembly or a pouch due to the electrolyte solution can be prevented. Further, a decrease in safety or reliability of a battery due to leakage of the electrolyte solution can be prevented.

The present invention will now be described through the following examples and is not limited thereto.

EXAMPLE 1

15 g of polyvinylidenfluoride was added to 600 ml of acetone and mixed at a ball mill for 2 hours to be dissolved. To the mixture were added 470 g of $LiCoO_2$ and 15 g of SUPER-P™ brand carbon black (sold by 3M Carbon Company) and then mixed for 5 hours to form a cathode active material composition.

The cathode active material composition was coated on an aluminum film having a thickness of 147 $\mu$m and a width of 4.9 cm using a doctor blade having a gap of 320 $\mu$m and dried to form a unit cathode plate.

Next, the anode plate may be fabricated as follows.

50 g of polyvinylidenefluoride was added to 600 ml of acetone and mixed with a ball mill for 2 hours to be dissolved. To the mixture were added 449 g of mezocarbon fiber (MCF) and 1 g of oxalic acid for increasing the adhesion to a copper film. Then, the combined materials were mixed for 5 hours to form an anode active material composition.

The anode active material composition was coated on a copper film having a thickness of 178 $\mu$m and a width of 5.1 cm using a doctor blade having a gap of 420 $\mu$m and dried to form a unit anode plate.

Separately, a polyethylene separator manufactured by Asahi Kasei Kogyo Kabushiki Kaisha was used as a separator. Here the width of the separator was 5.25 cm and the thickness thereof was 18 $\mu$m.

The polyethylene separator was interposed between the cathode plate and the anode plate. Then the sandwiched separator was wound in a jelly-roll type configuration to fabricate an electrode assembly. The fabricated electrode assembly is put into a pouch.

Three grams of prepolymer for forming an epoxy resin, represented by formula 1, having a molecular weight of 2000, and 1 g of amine represented by formula 2, were mixed with 12 g of 1M $LiPF_6$ dissolved in a mixture solvent containing propylene carbonate (PC) and ethylene carbonate (EC) in the ratio by volume of 1:1. Six grams of the obtained mixture was injected into the pouch battery obtained in the above-described manner. The pouch was then hermetically sealed. The resultant structure was allowed to stand in an oven maintained at 85° C. for 2 hours, thereby completing a lithium secondary battery.

EXAMPLE 2

In the step of mixing the mixture of 3 g of prepolymer for forming the epoxy resin represented by formula 1 and 1 g of the amine represented by formula 2 with 12 g of 1M $LiPF_6$ dissolved in a mixture solvent containing PC and EC in the ratio by volume of 1:1, a lithium secondary battery was completed in the same manner as in Example 1. However, the 1M $LiPF_6$ was dissolved in a mixture solvent containing PC, EC and vinylene carbonate (VC), and a volumetric ratio of 4:4:2 was used. In Example 1, 1M LiPF6 was dissolved in a solvent mixture containing PC and EC in the ratio by volume of 1:1.

EXAMPLE 3

A lithium secondary battery was completed in the same manner as in Example 1, with the exception that 3 g of prepolymer for forming the epoxy resin represented by formula 1 and 2 g of amine represented by formula 2 were used.

EXAMPLE 4

A lithium secondary battery was completed in the same manner as in Example 1, with the exception that 1 g of $Li_2CO_3$ was further added in the course of preparing the cathode active material composition and the anode active material composition.

Comparative Example

A lithium secondary battery was completed in the same manner as in Example 1, with the exception that the electrolyte solution 1.15M $LiPF_6$ was dissolved in a mixture solvent of EC, dimethyl carbonate (DMC), and diethyl carbonate (DEC) in the volumetric ratio of 3:3:4.

Figure 3:
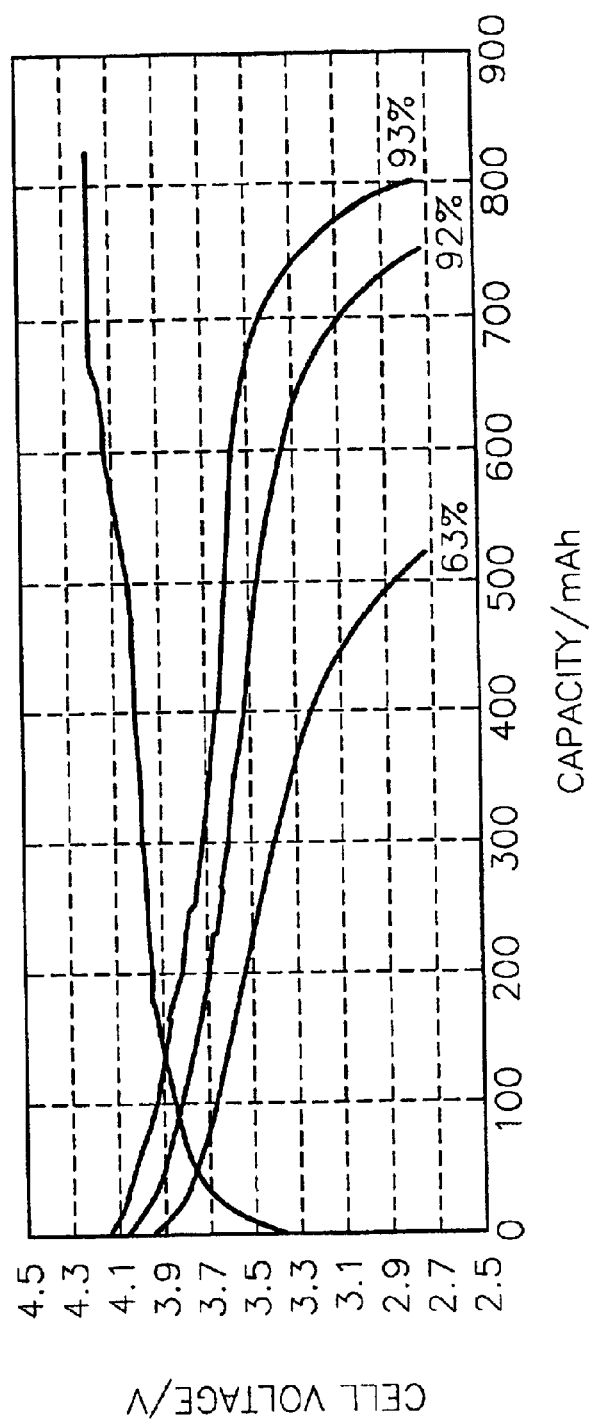
FIG. 3 is a graph showing the charge/discharge characteristic by rate of a lithium secondary battery according to an embodiment of the present invention.

The charge/discharge characteristics of the lithium secondary battery prepared by Example 1 were evaluated and the results thereof shown in FIG. 3.

Referring to FIG. 3, it was confirmed that the lithium secondary battery prepared by Example 1 had excellent charge/discharge characteristics.

In the lithium secondary batteries prepared by Examples 1 through 4 and the Comparative Example, the reliability and safety of batteries were evaluated. The reliability of the batteries was evaluated by examining the extent of swelling after the battery is allowed to stand at 80° C. for 3 days. The safety of a battery was evaluated by carrying out piercing of the battery and overcharging tests.

The evaluation results showed that the lithium secondary batteries prepared by Examples 1 through 4 had excellent reliability and safety compared to the lithium secondary battery prepared by the Comparative Example. This is because the lithium secondary batteries prepared by Examples 1 through 4 used gel-state electrolyte solutions so that the electrolyte solutions seldom leaked out. This was unlike the lithium secondary battery prepared by the Comparative Example, which uses a liquid-phase electrolyte solution. Also, with Examples 1 through 4, swelling of an electrode assembly or a pouch due to an electrolyte solution can be prevented. Thus, the lithium secondary batteries prepared by Examples 1 through 4 experience little deterioration in the reliability and safety.

In the cases of further adding vinylene carbonate as an organic solvent forming the electrolyte solution as in Example 2 and further adding $Li2CO_3$ in the course of preparing the cathode and anode active material composition as in Example 4, it was confirmed that the lifetime characteristics were particularly superior.

According to the present invention, swelling caused by an electrolyte solution can be effectively suppressed, and the electrolyte solution leakage is seldom a problem. Accordingly, a reliable and safe lithium secondary battery can be obtained.

Although the present invention has been described with reference to the preferred examples, the foregoing disclosure should be interpreted as illustrative only and it should be understood that various modifications and variations can be easily made by those skilled in the art without departing from the spirit of the invention, the scope of which is defined in the claims and their equivalents.

What is claimed is:

1. An electrolyte gel solution comprising a crosslinked product of (i) a prepolymer for forming an epoxy resin, (ii) an amine, (iii) a lithium salt and (iv) an organic solvent, wherein the prepolymer for forming the epoxy resin is a compound represented by formula 1:

(1)

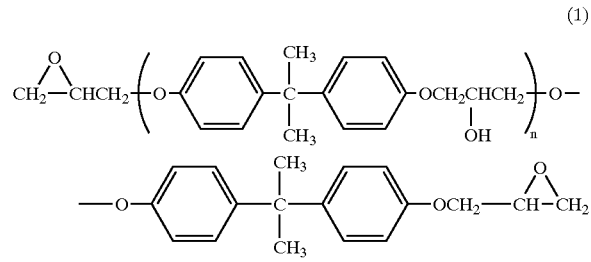

wherein n is an integer in the range of 2 through 100.

2. The electrolyte gel solution according to claim 1, wherein the lithium salt is at least one salt selected from the group consisting of lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$) and lithium bistrifluoromethanesulfonyl amide ($LiN(CF_3SO_2)_2$), and the organic solvent is at least one carbonate based solvent selected from the group consisting of propylene carbonate (PC), ethylene carbonate (EC), dimethylcarbonate (DMC), methylethyl carbonate (MEC), diethylcarbonate (DEC) and vinylene carbonate (VC).

3. The electrolyte gel solution according to claim 1, wherein the amine is represented by formula 2:

(2)

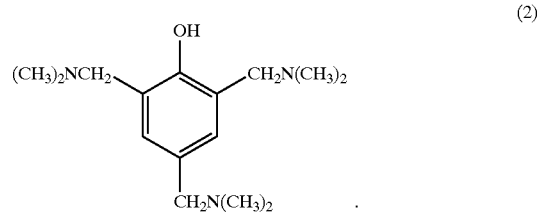

4. The electrolyte gel solution according to claim 1, wherein the molar ratio of the prepolymer for forming the epoxy resin to the amine is in the range of 1:1 to 5:1.

5. The electrolyte gel solution according to claim 1, wherein the ratio of the total weight of the prepolymer for forming the epoxy resin and the amine to the total weight of the lithium salt and the organic solvent is in the range of 1:1 to 1:20.

6. A lithium battery comprising:

an electrode assembly comprising a cathode, an anode and a separator interposed between the cathode and the anode;

an electrolyte gel solution comprising a crosslinked product of (i) a prepolymer for forming an epoxy resin, (ii) an amine, (iii) a lithium salt and (iv) an organic solvent; and a case for accommodating the electrode assembly and the electrolyte gel solution, wherein the prepolymer for forming the epoxy resin is a compound represented by formula 1:

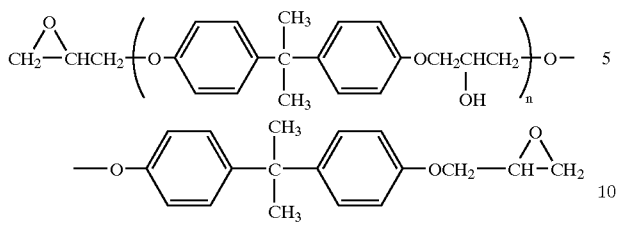

(1)

wherein n is an integer in the range of 2 through 100.

7. The lithium battery according to claim 6, wherein
the lithium salt is at least one salt selected from the group consisting of lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$) and lithium bistrifluoromethanesulfonyl amide ($LiN(CF_3SO_2)_2$), and the organic solvent is at least one carbonate based solvent selected from the group consisting of propylene carbonate (PC), ethylene carbonate (EC), dimethylcarbonate (DMC), methylethyl carbonate (MEC), diethylcarbonate (DEC) and vinylene carbonate (VC).

8. The lithium battery according to claim 6, wherein the electrode assembly is formed of a winding type electrode assembly, and the case is in the form of a pouch.

9. The lithium battery according to claim 6, wherein the amine is represented by formula 2:

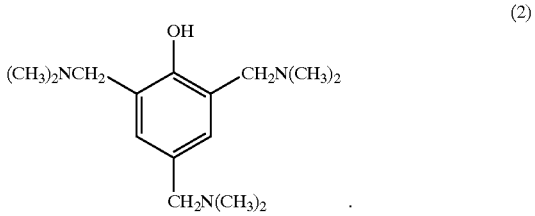

(2)

10. The lithium battery according to claim 6, wherein the molar ratio of the prepolymer for forming the epoxy resin to the amine is in the range of 1:1 to 5:1.

11. The lithium battery according to claim 6, wherein the ratio of the total weight of the prepolymer for forming the epoxy resin and the amine to the total weight of the lithium salt and the organic solvent is in the range of 1:1 to 1:20.

12. The lithium battery according to claim 6, wherein the separator is a polyethylene separator or a polypropylene separator.

13. A lithium battery comprising:
   an electrode assembly comprising a cathode, an anode and a separator interposed between the cathode and the anode;
   an electrolyte gel solution comprising a crosslinked product of (i) a prepolymer for forming an epoxy resin, (ii) an amine, (iii) a lithium salt and (iv) an organic solvent; and
   a case for accommodating the electrode assembly and the electrolyte gel solution,
   wherein the electrolyte gel solution is obtained by mixing a first solution of the prepolymer for forming the epoxy resin and the amine with a second solution of the lithium salt and the organic solvent, injecting the resultant mixture into the case having the electrode assembly therein to form a solution filled case, and thermally polymerizing the solution filled case.

14. The lithium battery according to claim 13, wherein the temperature of thermal polymerization is in the range of 70 to 200° C.

15. A method of forming a lithium battery, comprising mixing a prepolymer for forming an epoxy resin and an amine to form a first solution;
   mixing a lithium salt and an organic solvent to form a second solution;
   mixing the first and second solutions to obtain an electrolyte gel solution;
   injecting the electrolyte gel solution into a case containing a cathode, an anode and a separator interposed between the cathode and the anode; and
   thermally polymerizing the electrolyte gel solution after injection.

16. The method of according to claim 15, wherein the temperature of thermal polymerization is the range of 70° C. to 200° C.

* * * * *